(12) United States Patent
Hanocka et al.

(10) Patent No.: US 10,475,195 B2
(45) Date of Patent: Nov. 12, 2019

(54) AUTOMATIC GLOBAL NON-RIGID SCAN POINT REGISTRATION

(71) Applicant: INTEL CORPORATION, Santa Clara, CA (US)

(72) Inventors: Rana Hanocka, Tel Aviv (IL); Shahar Fleishman, Hod Hasharon (IL); Jackie Assa, Tel Aviv (IL)

(73) Assignee: INTEL CORPORATION, Santa Clara, CA (US)

( * ) Notice: Subject to any disclaimer, the term of this patent is extended or adjusted under 35 U.S.C. 154(b) by 162 days.

(21) Appl. No.: 15/454,734

(22) Filed: Mar. 9, 2017

(65) Prior Publication Data

US 2018/0260965 A1    Sep. 13, 2018

(51) Int. Cl.
*G06T 7/32* (2017.01)
*G06T 3/00* (2006.01)

(52) U.S. Cl.
CPC .............. *G06T 7/32* (2017.01); *G06T 3/0075* (2013.01); *G06T 2207/10028* (2013.01)

(58) Field of Classification Search
CPC .............................. G06T 7/32; G06T 3/0075; G06T 2207/10028
USPC ......................................................... 382/154
See application file for complete search history.

(56) References Cited

U.S. PATENT DOCUMENTS

2013/0136313 A1* 5/2013 Maeda ............... G06K 9/00577
382/111

2015/0009214 A1* 1/2015 Lee .......................... G06T 17/10
345/420
2015/0302142 A1* 10/2015 Gruber ................... G16B 15/00
506/8

OTHER PUBLICATIONS

Pankaj, Dhanya S., and Rama Rao Nidamanuri. "A robust estimation technique for 3D point cloud registration." Image Analysis & Stereology 35.1 (2016): 15-28.*
Chen, Siyuan, and Sargur Srihari. "Use of exterior contours and shape features in off-line signature verification." Document Analysis and Recognition, 2005. Proceedings. Eighth International Conference on. IEEE, 2005.*

(Continued)

*Primary Examiner* — Jonathan S Lee
(74) *Attorney, Agent, or Firm* — Finch & Maloney PLLC

(57) ABSTRACT

Techniques are provided for global (non-rigid) scan point registration between a scanned object and an associated model, from an arbitrary initial starting position, based on a combination of iterative coarse registration and fine registration. A methodology implementing the techniques according to an embodiment includes generating a model transformation based on a coarse registration between the model and the point scan. The method further includes calculating an alignment metric based on a distance measurement between the point scan and the transformed model. If the alignment metric exceeds a selected threshold value, a fine registration is performed between the transformed model and the point scan. Otherwise, the method continues by performing a random rotation of the model; a translation of the rotated model towards a centroid of the point scan; and iterating the coarse registration using the translated model until the alignment metric is achieved, after which the fine registration is performed.

24 Claims, 9 Drawing Sheets
(4 of 9 Drawing Sheet(s) Filed in Color)

(56) References Cited

OTHER PUBLICATIONS

Golyanik, Vladislav, et al. "Extended coherent point drift algorithm with correspondence priors and optimal subsampling." Applications of Computer Vision (WACV), 2016 IEEE Winter Conference on. IEEE, 2016.*

Bellekens, Ben, et al. "A survey of rigid 3D pointcloud registration algorithms." AMBIENT 2014: the Fourth International Conference on Ambient Computing, Applications, Services and Technologies, Aug. 24-28, 2014, Rome, Italy. 2014. (Year: 2014).*

Yang, Jiaqi, Zhiguo Cao, and Qian Zhang. "A fast and robust local descriptor for 3D point cloud registration." Information Sciences 346 (2016): 163-179. (Year: 2010).*

Guo, Yulan, et al. "An accurate and robust range image registration algorithm for 3D object modeling." IEEE Transactions on Multimedia 16.5 (2014): 1377-1390. (Year: 2014).*

Myronenko, Andriy, and Xubo Song. "Point set registration: Coherent point drift." IEEE transactions on pattern analysis and machine intelligence 32.12 (2010): 2262-2275. (Year: 2010).*

Myronenko, A. et al., "Point set registration: coherent point drift", IEEE Trans. on Pattern Analysis and Machine Intelligence, Dec. 2010, vol. 32, pp. 2262-2275.

Zhang, Zhengyou, "Iterative point matching for registration of free-form curves and surfaces", 1994, International Journal of Computer Vision, vol. 13, pp. 119-152.

Aiger, D. et al., "4-Points congruent sets for robust surface registration", ACM Transactions on Graphics, 2008, vol. 27, pp. 1-10.

\* cited by examiner

AUTOMATIC GLOBAL NON-RIGID SCAN POINT REGISTRATION

BACKGROUND

Registration techniques (both rigid and non-rigid) are employed in many scene perception systems, including robotics, navigation, and virtual reality applications, where objects in the scene can be semantically understood by associating them with known object models. Registration of two 3-dimensional objects requires an estimation of the translation, rotation, and scaling between the objects, such that an alignment can be determined between the scanned object and the object model. Some existing techniques perform a coarse registration between objects, but are sensitive to large differences in the initial orientations of the objects relative to each other. Some such techniques assume that there is no significant in-plane rotation and will fail if that is not the case. Other techniques rely on assumed geometric constraints, and can be highly sensitive to noise in the scan measurements.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features and advantages of embodiments of the claimed subject matter will become apparent as the following Detailed Description proceeds, and upon reference to the Drawings, wherein like numerals depict like parts.

Figure 1:
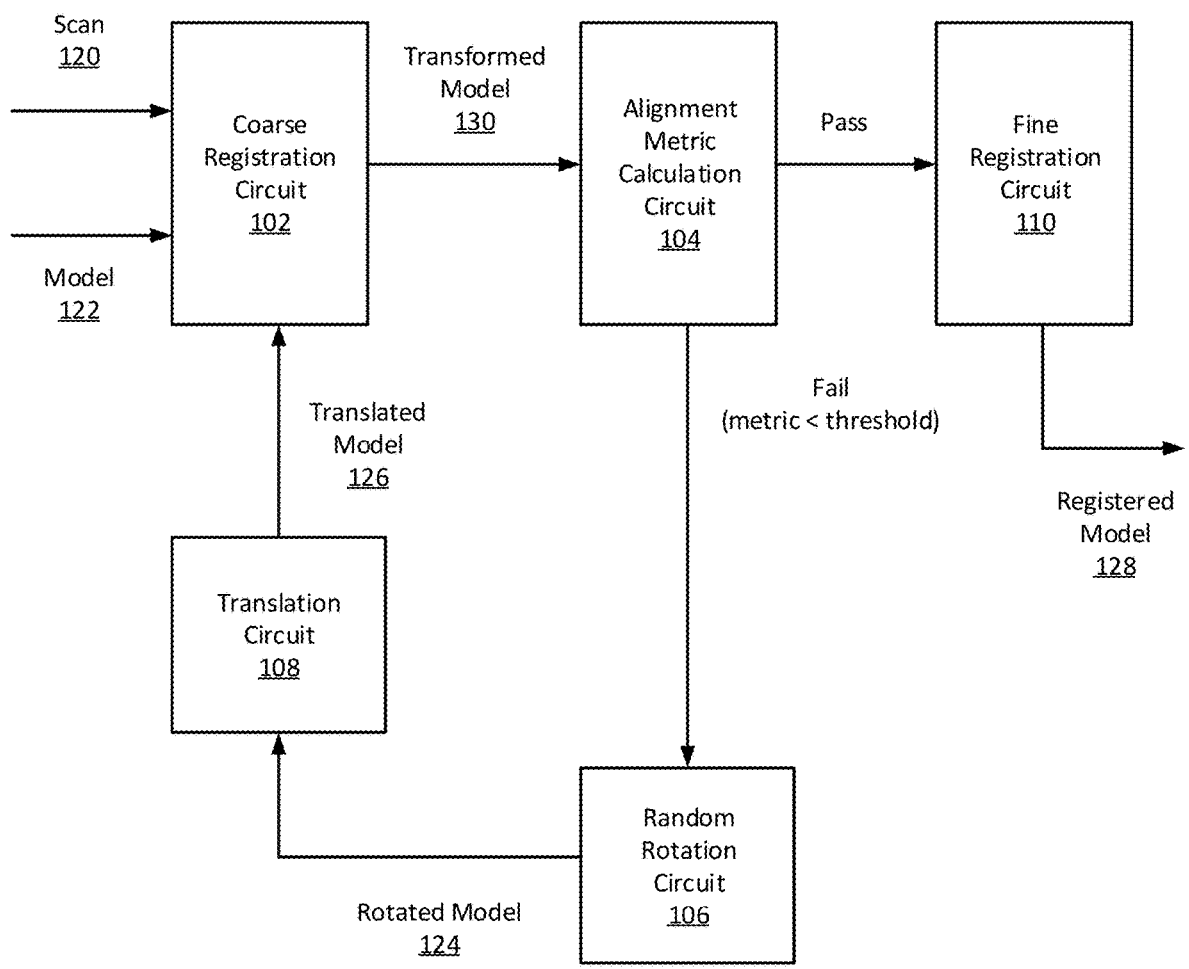
FIG. 1 is a block diagram of a scan point registration system, configured in accordance with certain embodiments of the present disclosure.

Although the following Detailed Description will proceed with reference being made to illustrative embodiments, many alternatives, modifications, and variations thereof will be apparent in light of this disclosure.

DETAILED DESCRIPTION

Generally, this disclosure provides techniques for automatic global (non-rigid) registration of scan points, for example from a 3-dimensional (3-D) scan. The registration process estimates the alignment, for example, between a 3-D scan of an object and an associated digital model of that object or of a similar object. The techniques allow for any arbitrary initial starting position, or relative orientation, between the scan and the model so that there is no requirement for user manipulation of the model prior to registration. The techniques also offer improved immunity to noise or occlusions in the scan. The disclosed techniques employ a combination of iterative coarse registrations, using random model rotations, followed by a fine registration process. The iterative coarse registrations continue until an alignment metric is satisfied or an iteration threshold is reached, after which the fine registration process is performed.

The registration techniques disclosed herein generally estimate a transformation of the digital object model that may include any combination of rotation, translation, and scaling, to achieve alignment between the digital model and the digital scan. In some embodiments, the model and the scan may be 2-dimensional, 3-dimensional, or n-dimensional. A 3-dimensional scan may be obtained, for example, from a depth camera or other suitable depth imaging device. Automatic global scan point registration, as described herein, can provide the aligned position of two objects, such as for example two chairs, as well as the finer details such as the locations of legs, armrests, or wheels.

The disclosed techniques can be implemented, for example, in a computing system or a software product executable or otherwise controllable by such systems, although other embodiments will be apparent. The system or product is configured to provide improved scan point registration. In accordance with an embodiment, a methodology to implement these techniques includes generating a model transformation based on a coarse registration between a model and a scan. The method further includes calculating an alignment metric based on a distance measurement between the scan points and a transformed model, where the transformed model is generated by application of the generated model transformation to the model. If the alignment metric exceeds a selected threshold value, a fine registration is performed between the transformed model and the scan points. Otherwise, if the alignment metric does not exceed the selected threshold value, a random rotation is applied to the model and the rotated model is translated toward a centroid of the scan points. An iteration of this methodology for scan point registration is then performed using the translated/rotated model until the alignment metric is achieved, at which point the fine registration is performed.

As will be appreciated, the techniques described herein may allow for improved scan point registration based on a combination of iterative coarse registration, calculation of an alignment metric with improved noise immunity, and a subsequent application of fine registration, compared to existing methods that perform only coarse or fine registration and rely on assumed geometric constraints. The disclosed techniques can be implemented on a broad range of platforms including laptops, tablets, smart phones, workstations, and scanning or imaging devices. These techniques may further be implemented in hardware or software or a combination thereof.

FIG. 1 is a block diagram of a scan registration system 100, configured in accordance with certain embodiments of the present disclosure. The system is shown to include a coarse registration circuit 102, an alignment metric calculation circuit 104, a random rotation circuit 106, a translation circuit 108, and a fine registration circuit 110. At a high level, the system is configured to perform iterative coarse registrations between scan points of the object 120 and a model of the object 122, followed by a fine registration after a satisfactory alignment metric has been achieved. In some embodiments, a 2-dimensional image scan may be provided by a camera, or a 3-dimensional point scan may be provided by a depth sensor. In some embodiments, the model may be provided from a database, for example from a manufacturer of the object or from a CAD design or other suitable source.

For each iteration, the object model 122 is rotated and translated, as will be described in greater detail below. The iterations continue until an alignment metric goal is achieved (or a maximum number of iterations have been completed), at which point a fine registration is performed. In some embodiments, the model 122 may be a 3-D model of the object and the point scan 120 is a 3-D point scan of the object. In other embodiments, the model 122 may be a 2-dimensional (2-D) model of the object and the image scan 120 is a 2-D image scan of the object. In general, however, the disclosed techniques can be applied to object models and point scans of any number of dimensions.

Coarse registration circuit 102 is configured to generate a model transformation based on a coarse registration between a model of an object 122 and a point scan of the object 120. In some embodiments, the coarse registration is based on a rigid Coherent Point Drift (CPD) operation. In other embodiments, coarse registration may be achieved using other known techniques, in light of the present disclosure. The generated model transformation is applied to the model 122 to provide a transformed model 130.

Alignment metric calculation circuit 104 is configured to calculate an alignment metric based on a distance measurement between the point scan 120 and the transformed model 130. In some embodiments, the alignment metric is calculated as the sum of the reciprocals of the Euclidean distance between each location data point of the transformed model 130 and a corresponding location data point of the scan 120, as will be explained in greater detail below.

Fine registration circuit 110 is configured to perform a fine registration between the transformed model and the scan, if the alignment metric exceeds a selected threshold value, indicating an acceptable coarse alignment. In some embodiments, the fine registration is based on a non-rigid CPD operation. In other embodiments, fine registration may be achieved using other known techniques, in light of the present disclosure.

Random rotation circuit 106 is configured to apply a random rotation to the model 122 to generate a rotated model 124, if the previously calculated alignment metric does not exceed the selected threshold value, indicating an unacceptable coarse alignment. The rotation allows for the next iteration of coarse registration to estimate an alignment from a new starting point or model orientation, which may help to avoid solutions that are associated with undesirable local minima that can differ significantly from the desired global registration solution.

Translation circuit 108 is configured to translate the rotated model 124 towards a centroid of the scan to achieve an improved match of the rotated model to the scan. In some embodiments, a scaling operation may also be performed on the translated and rotated model 126 to further improve the match with the scan. The translated and rotated model 126 is provided to the coarse registration circuit 102, as a substitute for the original model 122, for the subsequent iteration(s).

In some embodiments, a pre-processing operation may be performed to re-mesh the model 122 (e.g., through downsampling and interpolation, or other known techniques in light of the present disclosure) to speed up the computation associated with the subsequent processes, as there will be fewer points in the re-meshed model. An optional re-meshing circuit (not shown) may be configured to perform this initial pre-processing operation on the object model 122.

Figure 2:
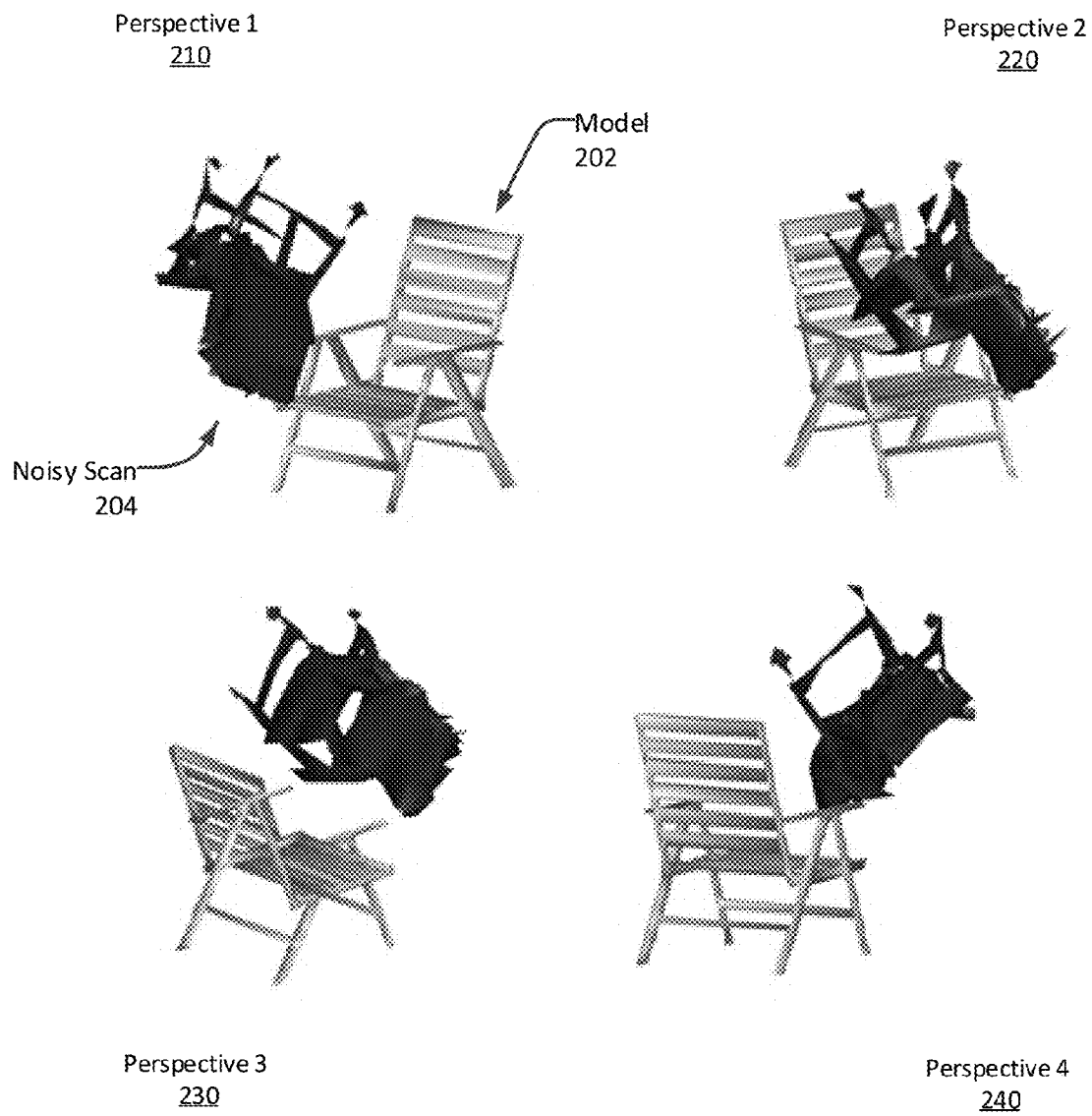
FIG. 2 illustrates scan of an object in an initial position, and an associated model to be used for registration, in accordance with certain embodiments of the present disclosure.

FIG. 2 illustrates a scan of an object and associated model 200, in accordance with certain embodiments of the present disclosure. A model 202 of an object, in this example a chair, is shown in yellow from four different perspectives 210, 220, 230, and 240. Additionally, a noisy scan 204 of a different chair is shown in blue from each of the same four perspectives. The chair in the scan 204 is shown to be at an arbitrary initial position which is at a different orientation, offset, and scale from the model 202. The registration process is configured to estimate a transformation (e.g., a rotation, translation, and scaling) that can be applied to the model 202 to align the model to the scan 204.

Figure 3:
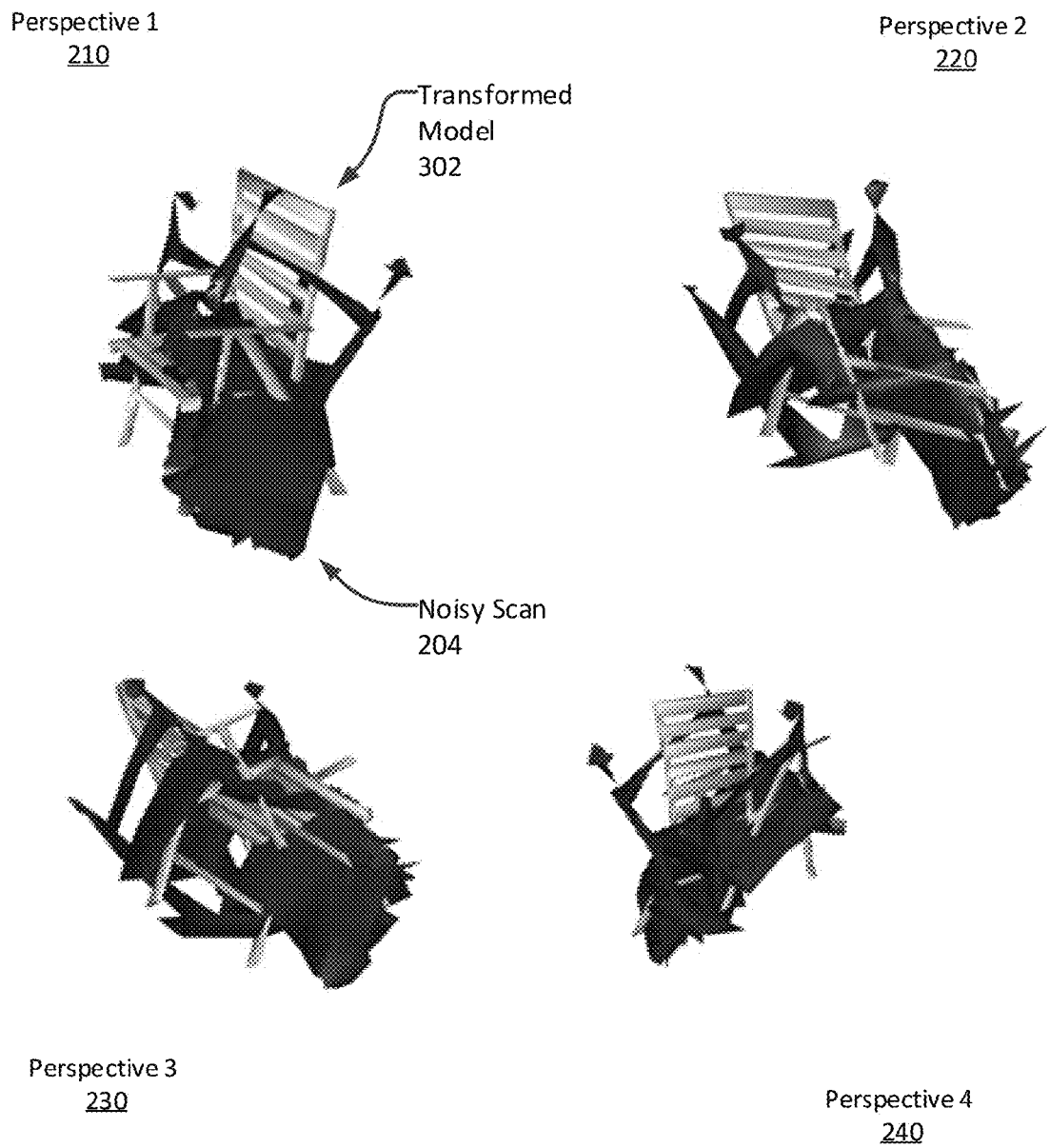
FIG. 3 illustrates results of direct application of fine registration alone.

FIG. 3 illustrates results 300 of direct application of fine registration alone, from four perspectives. In this example, a fine registration, based on non-rigid CPD, was applied to the model 204 to generate transformed model 302, without the benefit of a prior coarse alignment. As can be seen in each of the four perspectives 210, 220, 230, and 240, the resulting registration alignment is unsatisfactory. This can occur when the CPD algorithm, or other employed technique, converges on (e.g., becomes trapped in) a local minimum that does not correspond to the correct registration.

Figure 4:
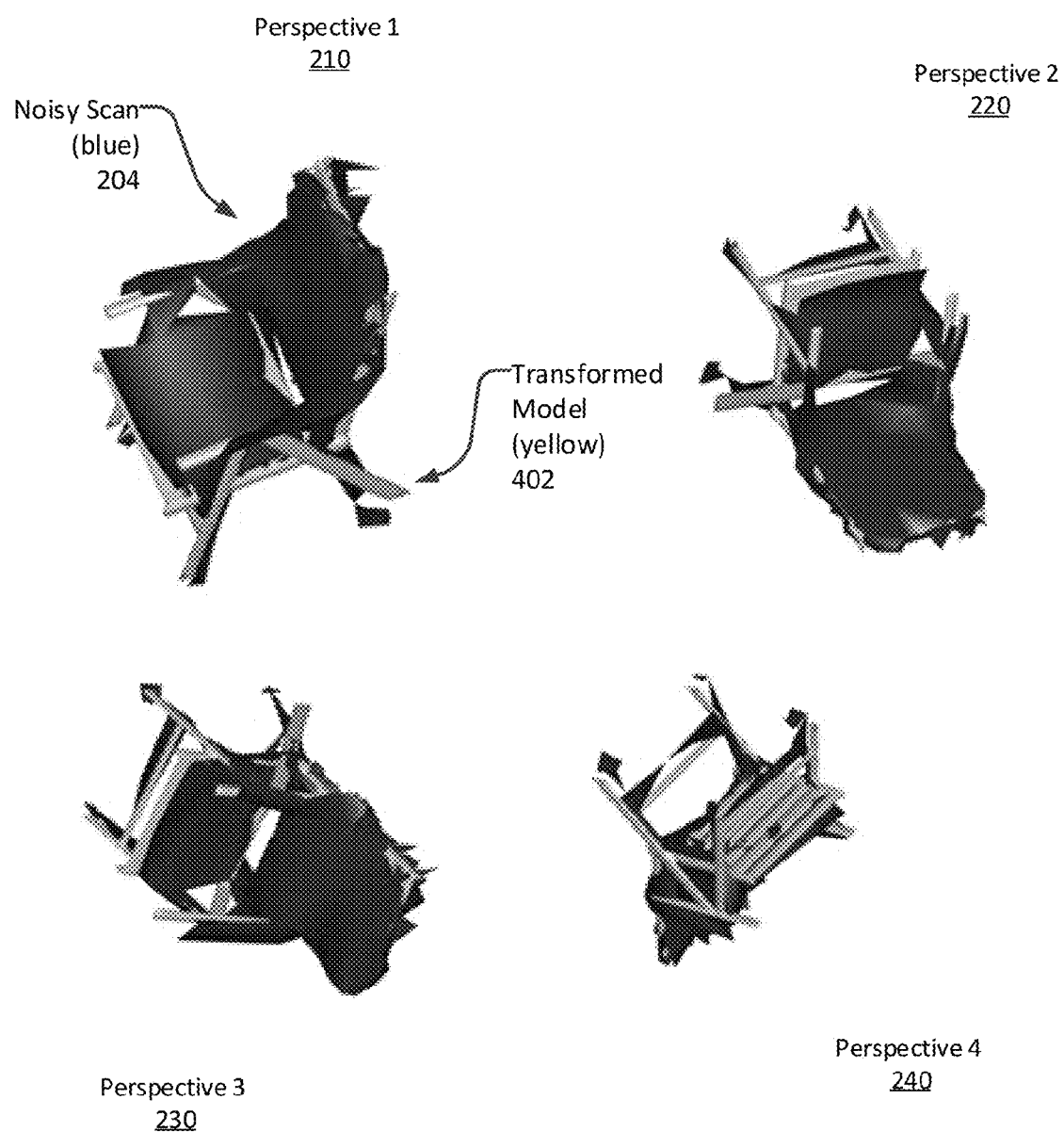
FIG. 4 illustrates results of iterative coarse registration, in accordance with certain embodiments of the present disclosure.

FIG. 4 illustrates results 400 of iterative coarse registration, in accordance with certain embodiments of the present disclosure. As can be seen in this illustration, from each of the four perspectives, the transformed model 402 resulting from iterative coarse registration exhibits improved alignment with the noisy scan 204.

Figure 5:
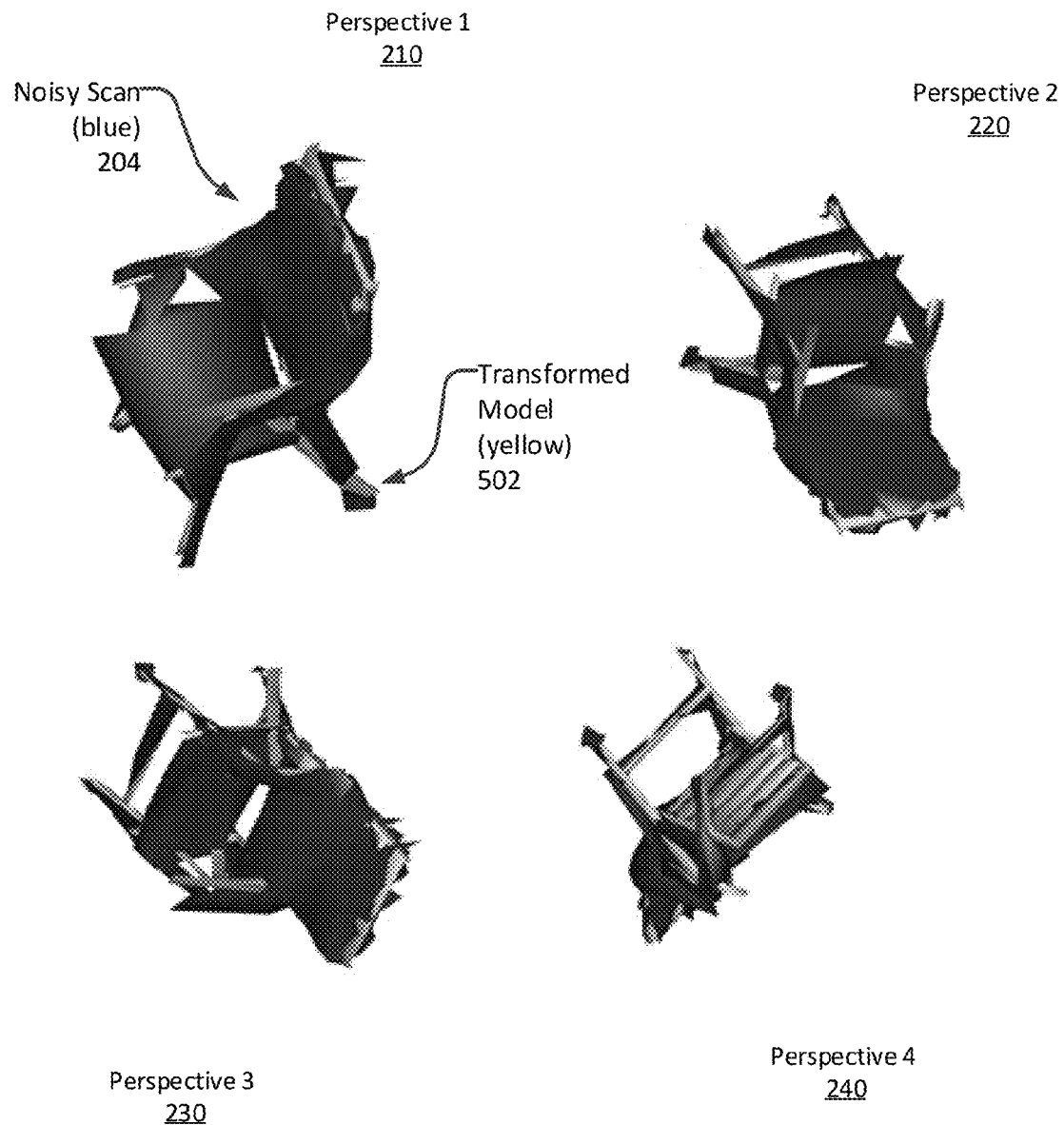
FIG. 5 illustrates results of iterative coarse registration followed by fine registration, in accordance with certain embodiments of the present disclosure.

FIG. 5 illustrates results 500 of iterative coarse registration, as described in FIG. 4, followed by fine registration, in accordance with certain embodiments of the present disclosure. As can be seen in this illustration, the fine registration further improves the alignment of the transformed model 502, particularly, for example, in the arms and legs of the chair.

Methodology

Figure 6:
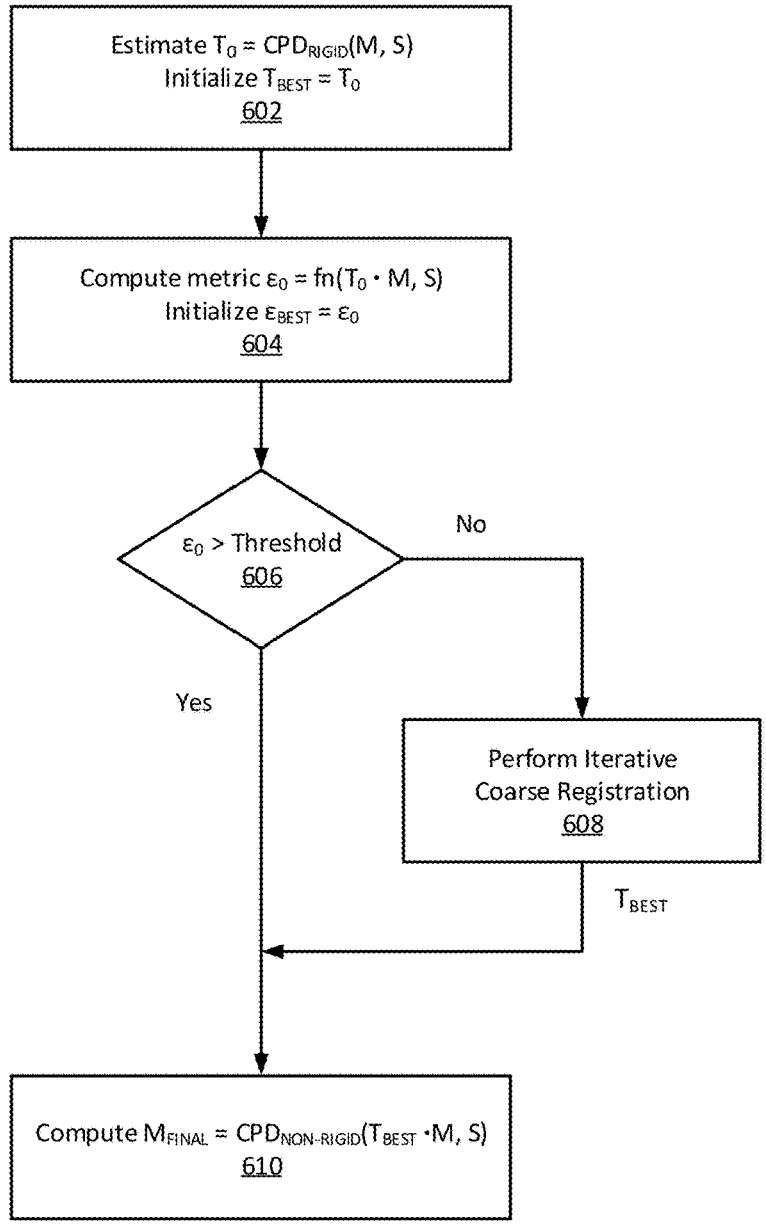
FIG. 6 is a flowchart illustrating a methodology for scan point registration, in accordance with certain embodiments of the present disclosure.
Figure 7:
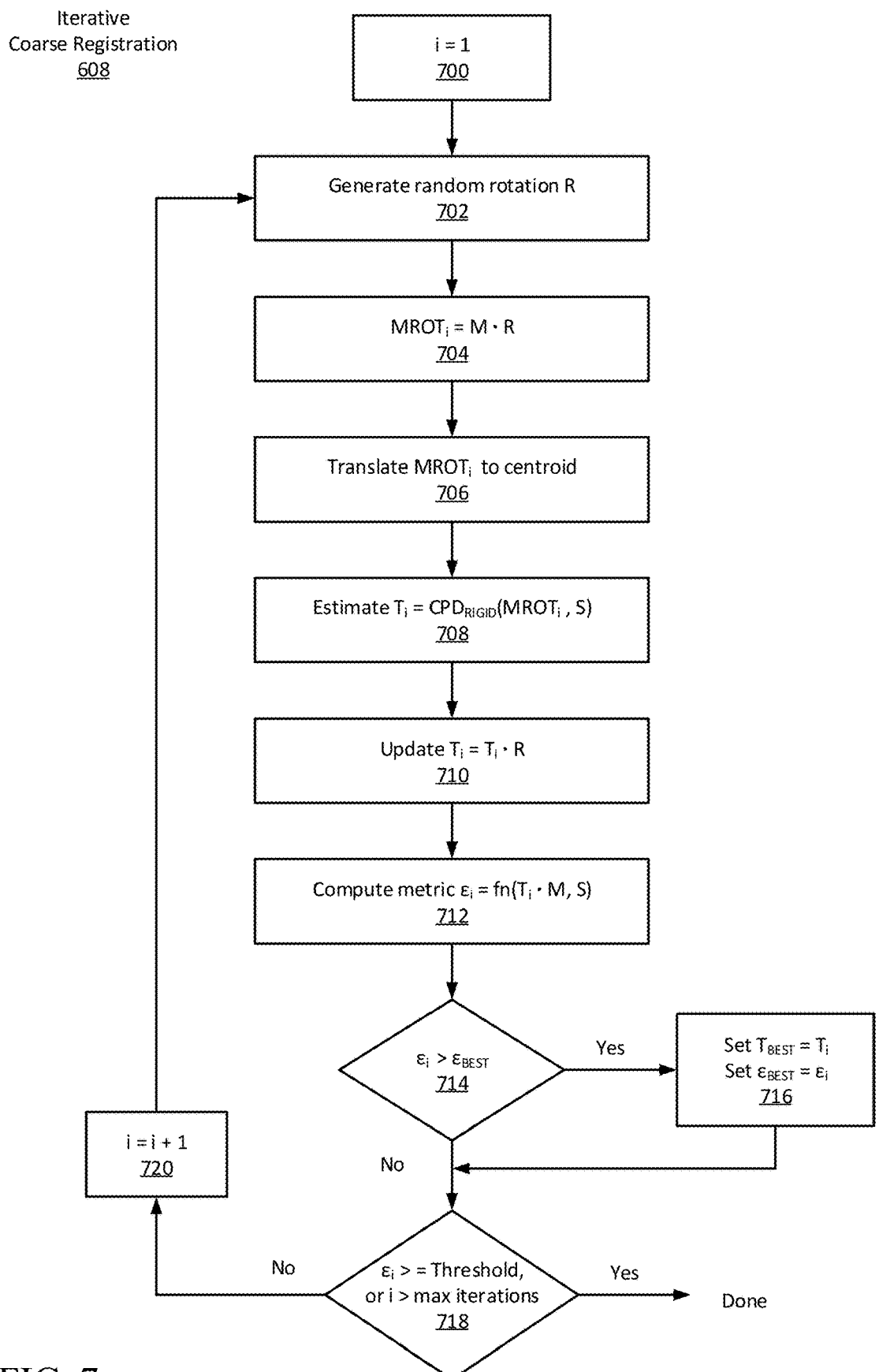
FIG. 7 is a flowchart illustrating a methodology for iterative coarse registration in greater detail, in accordance with certain embodiments of the present disclosure.
Figure 8:
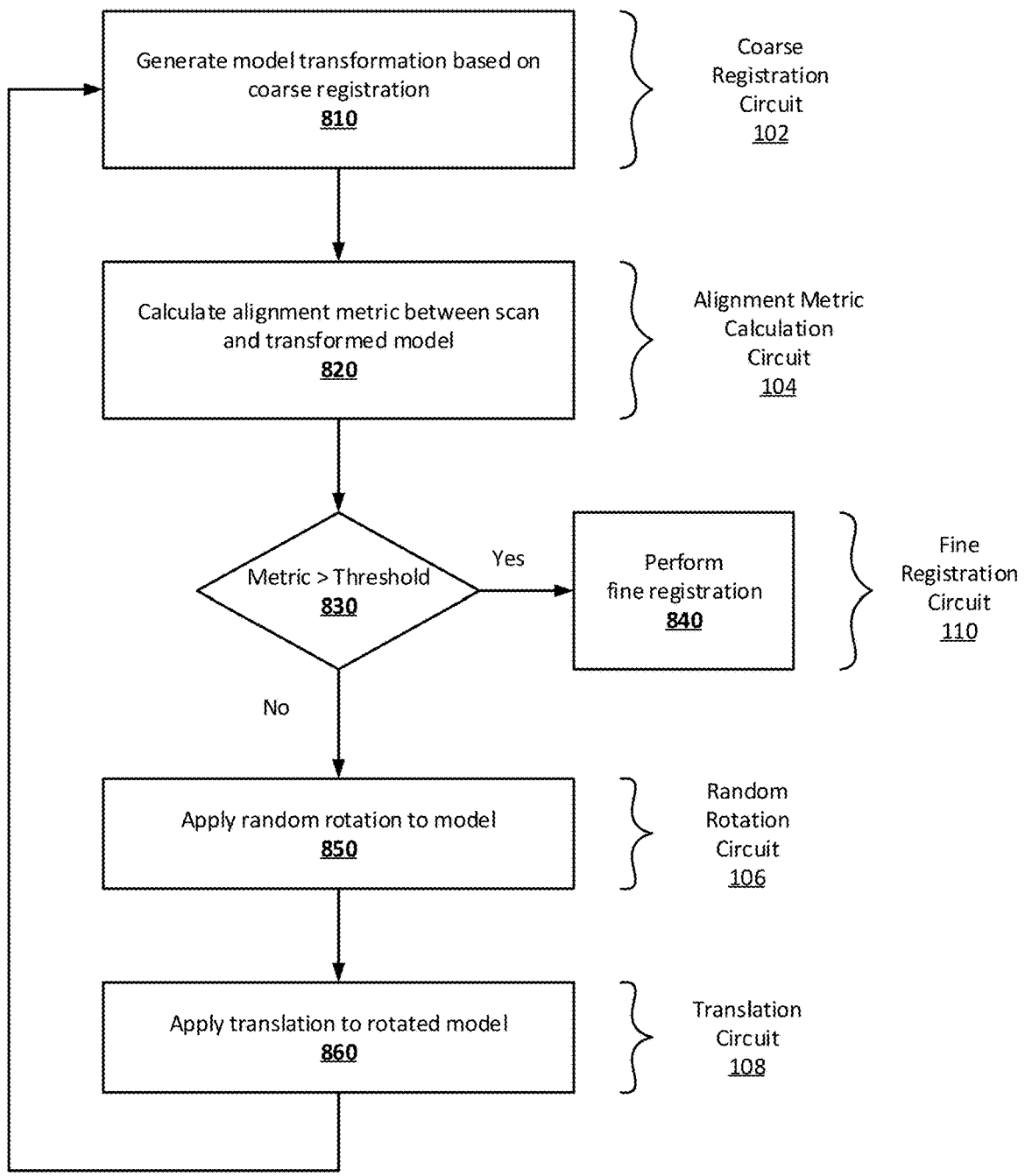
FIG. 8 is a flowchart illustrating another methodology for scan point registration, in accordance with certain embodiments of the present disclosure.

FIGS. 6-8 are flowcharts illustrating example methods 600, 608, and 800 for scan point registration, in accordance with certain embodiments of the present disclosure. As can be seen, the example methods include a number of phases and sub-processes, the sequence of which may vary from one embodiment to another. However, when considered in the aggregate, these phases and sub-processes form a process for scan point registration in accordance with certain of the embodiments disclosed herein. These embodiments can be implemented, for example using the system architecture illustrated in FIG. 1 as described above. However other system architectures can be used in other embodiments, as will be apparent in light of this disclosure. To this end, the correlation of the various functions shown in FIGS. 6-8 to the specific components illustrated in the other figures is not intended to imply any structural and/or use limitations. Rather, other embodiments may include, for example, varying degrees of integration wherein multiple functionalities are effectively performed by one system. For example, in an alternative embodiment a single module can be used to perform all of the functions of methods 600, 608, and 800. Thus, other embodiments may have fewer or more modules and/or sub-modules depending on the granularity of implementation. In still other embodiments, the methodology depicted can be implemented as a computer program product including one or more non-transitory machine readable mediums that when executed by one or more processors cause the methodology to be carried out. Numerous variations and alternative configurations will be apparent in light of this disclosure.

As illustrated in FIG. 6, in one embodiment, method 600 for scan point registration commences at operation 602 by estimating an initial transformation $T_0$ between a point scan S of an object and a model M of the object. M and S may be represented, for example, by matrices of dimension m×d and s×d respectively, where m is the number of points (e.g., vertices or centroids) in M, s is the number of points in S, and d is the dimension (e.g., typically 3 dimensions or 2 dimensions). So, for example, a 3-dimensional model might have 300 x,y,z points and a 3-dimensional point scan might have 200 x,y,z points. In that case the size of M would be 300×3 and the size of S would be 200×3. Although the disclosed techniques do not require that the number of points in the model match the number of points in the scan, in some embodiments, a pre-processing operation may be performed to re-mesh the model (e.g., down-sample and interpolate) to increase the computational speed of the registration processes. So, for example, M may be resampled down to 200×3.

In some embodiments, the transformation is estimated using a rigid CPD algorithm. An estimate of the best transformation $T_{BEST}$ (i.e., one of the final goals of the registration process) is initialized to $T_0$.

Next, at operation 604, an initial alignment metric $\varepsilon_0$ is computed as a function of the transformed model $M'=T_0 \cdot M$, and the point scan S. An estimate of the best alignment metric $\varepsilon_{BEST}$ is initialized to $\varepsilon_0$. In some embodiments, the alignment metric is calculated as:

$$\varepsilon(M', S) = \sum_{s \in S} \sum_{m \in M'} \frac{1}{\|M'(m, :) - S(s, :)\|^2 + \epsilon}$$

where M'(m, :) and S(s, :) correspond to vectors composed of the $m^{th}$ and $s^{th}$ row in M' and S respectively, and $\|\bullet\|^2$ corresponding to the Euclidian distance between the two vectors (e.g., an L2-norm). The $\epsilon$ term is a small value chosen to avoid division by zero. Because the point scan may be provided by a depth sensor which can be noisy, partially occluded, and/or somewhat different from the corresponding CAD model, a conventional L2 or L1 metric may not provide a good solution since those metrics tend to move the centroids of the objects together. In contrast, the metric described above favorably weights many point correspondences between the model and the scan, but diminishes the importance of point correspondences that are too far away (e.g., outliers). Said differently, the metric provides higher scores to good matches and lower scores to poor matches, even in the presence of scan imperfections.

At operation 606, the metric is compared to a selected threshold. If the metric is greater than the threshold, the transformation $T_{BEST}$, (and the transformed model M') are considered to represent a good registration between the model and the scan, and the method proceeds to operation 610, where the fine registration is performed. Otherwise, the method proceeds to operation 608 where an iterative coarse registration is performed, as described in greater detail in association with FIG. 7 below.

In some embodiments, the fine registration, performed at operation 610, is based on a non-rigid CPD algorithm applied to the transformed model $T_{BEST} \cdot M$ and the point scan S to produce a final registered model $M_{FINAL}$.

FIG. 7 illustrates the iterative coarse registration process 608 in greater detail. A counter variable i is initialized to one at operation 700. Next, at operation 702, a random rotation matrix R is generated, and is applied to the model M, at operation 704, to generate a rotated model $MROT_i$ for the current iteration.

At operation 706, the rotated model $MROT_i$ is translated to a centroid of the scanned object. The centroid (or center of mass) of an s×d scan S point cloud may be calculated as:

$$\mu(S) = \left\{ \frac{1}{s}\sum_{i=1}^{s} S(i, d=1)_1, \frac{1}{s}\sum_{i=1}^{s} S(i, d=2)_2, \ldots, \frac{1}{s}\sum_{i=1}^{s} S(i, d=N)_N \right\}.$$

At operation 708, a new transformation $T_i$ is estimated, based on a rigid CPD applied to the translated/rotated model $MROT_i$ and the scan S. At operation 710, the new transformation $T_i$ is also a rotated by the rotation matrix R.

At operation 712, a new alignment metric $\varepsilon_i$ is computed as a function of a new transformed model $T_i \cdot M$, and the point scan S. At operation 714, if the new alignment metric $\varepsilon_i$ is greater than the current best alignment metric $\varepsilon_{BEST}$, then at operation 716, is $T_{BEST}$ updated to $T_i$, and $\varepsilon_{BEST}$ is updated to $\varepsilon_i$.

At operation 718, if $\varepsilon_i$ is greater than or equal to the threshold or if i exceeds a selected maximum number of iterations, then the iterative coarse registration process 608 completes and the current $T_{BEST}$ is used by the fine registration operation 610. Otherwise, at operation 720, the counter variable i is incremented and the iterative process repeats from operation 702 with a new random rotation.

As illustrated in FIG. 8, in another embodiment, method 800 for scan point registration commences by generating, at operation 810, a model transformation based on a coarse registration between a model and a point scan. In some embodiments, the coarse registration is based on a rigid Coherent Point Drift (CPD) operation. The model and the point scan may be represented in any number of dimensions including 3 dimensions and 2 dimensions.

Next, at operation 820, an alignment metric is calculated based on a distance measurement between the point scan and the transformed model generated by application of the model transformation to the model. In some embodiments, the alignment metric circuit is calculated as a summation of the reciprocals of the Euclidean distance between each location data point of the transformed model and a corresponding location data point of the scan.

At operation 830, the alignment metric is compared to a selected threshold value. If the alignment metric exceeds the threshold value, then a fine registration is performed between the transformed model and the point scan, at operation 840, to produce a final version of the registered model. In some embodiments, the fine registration is based on a non-rigid CPD operation.

Otherwise, at operation 850, a random rotation is applied to the model, and at operation 860 a translation is applied to the rotated model to shift it towards the centroid (e.g., center of gravity) of the point scan. The method then iterates, starting again from operation 810, until either a desirable alignment metric is achieved or a maximum number of iterations have been performed.

Of course, in some embodiments, additional operations may be performed, as previously described in connection with the system. For example, a pre-processing operation may be performed to re-mesh the model (e.g., down-sample and interpolate) to improved computational speed.

Example System

Figure 9:
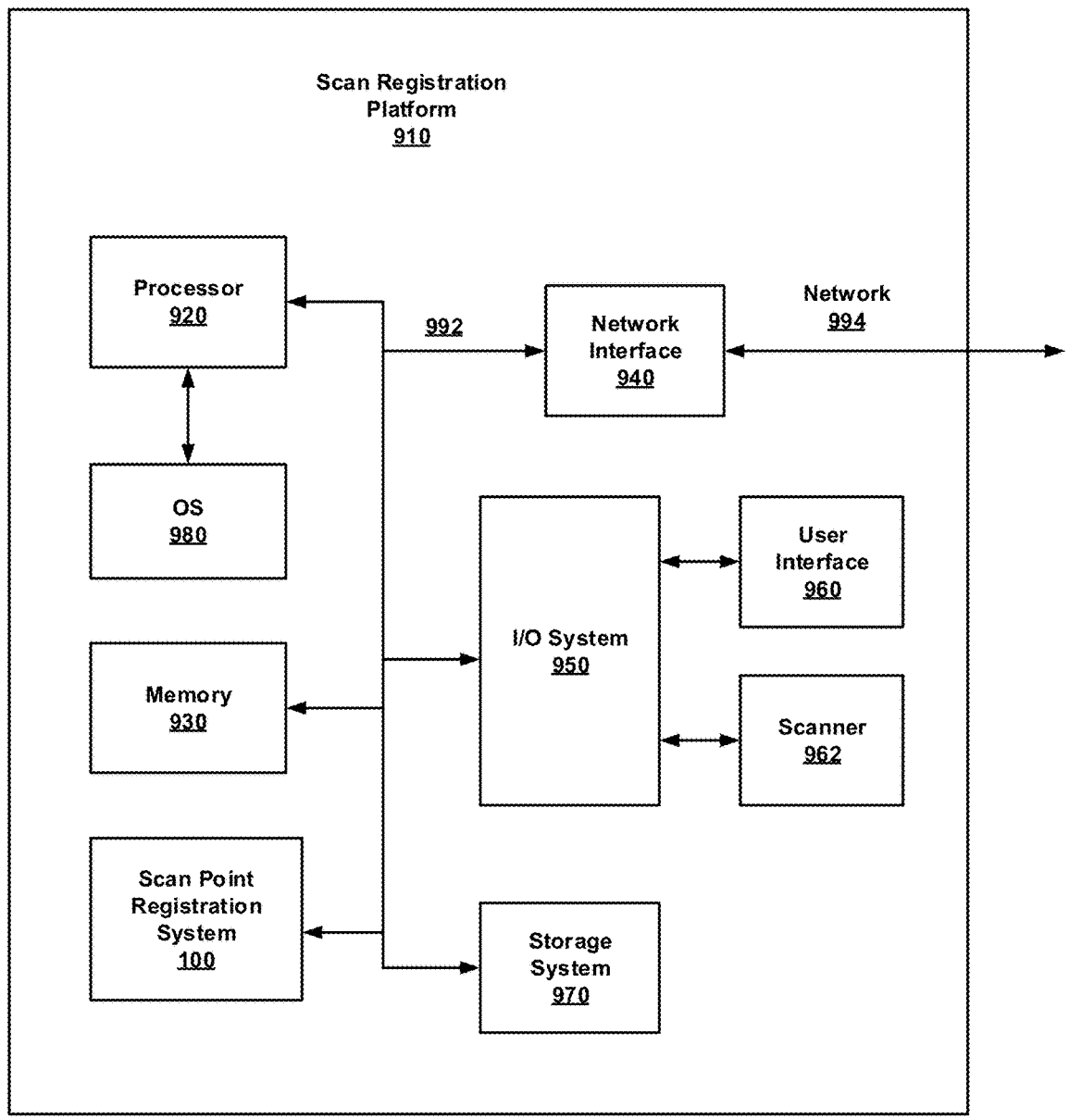
FIG. 9 is a block diagram schematically illustrating a platform to perform scan point registration, configured in accordance with certain embodiments of the present disclosure.

FIG. 9 illustrates an example system 900 to perform scan point registration, configured in accordance with certain embodiments of the present disclosure. In some embodiments, system 900 comprises a scan point registration platform 910 which may host, or otherwise be incorporated into a personal computer, workstation, server system, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), messaging device, data communication device, scanning device, imaging device, and so forth. Any combination of different devices may be used in certain embodiments.

In some embodiments, platform 910 may comprise any combination of a processor 920, a memory 930, scan point registration system 100, a network interface 940, an input/output (I/O) system 950, a user interface 960, a scanner 962, and a storage system 970. As can be further seen, a bus and/or interconnect 992 is also provided to allow for communication between the various components listed above and/or other components not shown. Platform 910 can be coupled to a network 994 through network interface 940 to allow for communications with other computing devices, platforms, or resources. Other componentry and functionality not reflected in the block diagram of FIG. 9 will be apparent in light of this disclosure, and it will be appreciated that other embodiments are not limited to any particular hardware configuration.

Processor 920 can be any suitable processor, and may include one or more coprocessors or controllers, such as an audio processor, a graphics processing unit, or a sensor hub processor, to assist in control and processing operations associated with system 900. In some embodiments, the processor 920 may be implemented as any number of processor cores. The processor (or processor cores) may be any type of processor, such as, for example, a microprocessor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 920 may be implemented as a complex instruction set computer (CISC) or a reduced instruction set computer (RISC) processor. In some embodiments, processor 920 may be configured as an x86 instruction set compatible processor.

Memory 930 can be implemented using any suitable type of digital storage including, for example, flash memory and/or random access memory (RAM). In some embodiments, the memory 930 may include various layers of memory hierarchy and/or memory caches as are known to those of skill in the art. Memory 930 may be implemented as a volatile memory device such as, but not limited to, a RAM, dynamic RAM (DRAM), or static RAM (SRAM) device. Storage system 970 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 970 may comprise technology to increase the storage performance enhanced protection for valuable digital media when multiple hard drives are included.

Processor 920 may be configured to execute an Operating System (OS) 980 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with system 900, and therefore may also be implemented using any suitable existing or subsequently-developed platform.

Network interface circuit 940 can be any appropriate network chip or chipset which allows for wired and/or wireless connection between other components of computer system 900 and/or network 994, thereby enabling system 900 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 950 may be configured to interface between various I/O devices and other components of computer system 900. I/O devices may include, but not be limited to, user interface 960, scanner 962. User interface 960 may include devices (not shown) such as a display element, touchpad, keyboard, mouse, microphone, and speaker, etc. I/O system 950 may include a graphics subsystem configured to perform processing of scan points for rendering on a display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 920 or any chipset of platform 910.

It will be appreciated that in some embodiments, the various components of the system 900 may be combined or integrated in a system-on-a-chip (SoC) architecture. In some embodiments, the components may be hardware components, firmware components, software components or any suitable combination of hardware, firmware or software.

Scan point registration system 100 is configured to register a point scan to a model, using a combination of iterative coarse registration followed by a fine registration after an alignment metric has been achieved, as described previously. Scan point registration system 100 may include any or all of the circuits/components illustrated in FIG. 1, as described above. These components can be implemented or otherwise used in conjunction with a variety of suitable software and/or hardware that is coupled to or that otherwise forms a part of platform 910. These components can additionally or alternatively be implemented or otherwise used in conjunction with user I/O devices that are capable of providing information to, and receiving information and commands from, a user.

In some embodiments, these circuits may be installed local to system 900, as shown in the example embodiment of FIG. 9. Alternatively, system 900 can be implemented in a client-server arrangement wherein at least some functionality associated with these circuits is provided to system 900 using an applet, such as a JavaScript applet, or other downloadable module. Such a remotely accessible module or sub-module can be provisioned in real-time, in response to a request from a client computing system for access to a given server having resources that are of interest to the user of the client computing system. In such embodiments, the server can be local to network 994 or remotely coupled to network 994 by one or more other networks and/or communication channels. In some cases, access to resources on a given network or computing system may require credentials such as usernames, passwords, and/or compliance with any other suitable security mechanism.

In various embodiments, system 900 may be implemented as a wireless system, a wired system, or a combination of both. When implemented as a wireless system, system 900 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 900 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the scan point registration methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 994. In other embodiments, the functionalities disclosed herein can be incorporated into other software applications, such as image perception systems, robotics, and virtual reality applications. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments system 900 may comprise additional, fewer, or alternative subcomponents as compared to those included in the example embodiment of FIG. 9.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hardcoded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smart phones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a method for scan point registration. The method comprises: generating, by a processor-based system, a model transformation based on a coarse registration between an object captured in a digital point scan and a digital object model; calculating, by the processor-based system, an alignment metric based on a distance measurement between the object of the digital point scan and a transformed digital object model, the transformed digital object model generated by application of the model transformation to the digital object model; if the alignment metric exceeds a selected threshold value, performing, by the processor-based system, a fine registration between the transformed digital object model and the object of the digital point scan; and if the alignment metric does not exceed the selected threshold value, performing, by the processor-based system a random rotation of the digital object model, a translation of the rotated digital object model towards a centroid of the object of the digital point scan, and an iteration of the method for scan point registration, using the translated digital object model.

Example 2 includes the subject matter of Example 1, wherein the alignment metric calculation further comprises summing the reciprocals of the Euclidean distance between each location data point of the transformed digital object model and a corresponding location data point of the object of the digital point scan.

Example 3 includes the subject matter of Examples 1 or 2, wherein the coarse registration is based on a rigid Coherent Point Drift (CPD) operation.

Example 4 includes the subject matter of any of Examples 1-3, wherein the fine registration is based on a non-rigid CPD operation.

Example 5 includes the subject matter of any of Examples 1-4, wherein the digital object model is a 3-dimensional (3-D) model and the object of the digital point scan is a 3-D depth scan.

Example 6 includes the subject matter of any of Examples 1-5, wherein the 3-D depth scan is provided by a depth camera.

Example 7 includes the subject matter of any of Examples 1-6, wherein the digital object model is a 2-dimensional (2-D) model and the object of the digital point scan is a 2-D image scan.

Example 8 includes the subject matter of any of Examples 1-7, further comprising performing a re-meshing operation on the digital object model, the re-meshing including down sampling and interpolation of location data points of the digital object model, based on sampling intervals of location data points of the object of the digital point scan.

Example 9 is a system for scan point registration. The system comprises: a coarse registration circuit to generate a model transformation based on a coarse registration between an object captured in a digital point scan and a digital object model; an alignment metric circuit to calculate an alignment metric based on a distance measurement between the object of the digital point scan and a transformed digital object model, the transformed digital object model generated by application of the model transformation to the digital object model; a fine registration circuit to perform a fine registration between the transformed digital object model and the object of the digital point scan, if the alignment metric exceeds a selected threshold value; a random rotation circuit to apply a random rotation to the digital object model to generate a rotated digital object model, if the alignment metric does not exceed the selected threshold value; and a translation circuit to translate the rotated digital object model towards a centroid of the object of the digital point scan, the translated digital object model for use by the coarse registration circuit in a scan point registration iteration.

Example 10 includes the subject matter of Example 9, wherein the alignment metric circuit is further to sum the reciprocals of the Euclidean distance between each location data point of the transformed digital object model and a corresponding location data point of the object of the digital point scan.

Example 11 includes the subject matter of Examples 9 or 10, wherein the coarse registration is based on a rigid Coherent Point Drift (CPD) operation.

Example 12 includes the subject matter of any of Examples 9-11, wherein the fine registration is based on a non-rigid CPD operation.

Example 13 includes the subject matter of any of Examples 9-12, wherein the digital object model is a 3-dimensional (3-D) model and the object of the digital point scan is a 3-D depth scan.

Example 14 includes the subject matter of any of Examples 9-13, further comprising a depth camera to provide the 3-D depth scan.

Example 15 includes the subject matter of any of Examples 9-14, wherein the digital object model is a 2-dimensional (2-D) model and the object of the digital point scan is a 2-D image scan.

Example 16 includes the subject matter of any of Examples 9-15, further comprising a re-meshing circuit to down sample and interpolate location data points of the digital object model, based on sampling intervals of location data points of the object of the digital point scan.

Example 17 is that least one non-transitory computer readable storage medium having instructions encoded thereon that, when executed by one or more processors, result in the following operations for scan point registration. The operations comprise: generating a model transformation based on a coarse registration between an object captured in a digital point scan and a digital object model; calculating an alignment metric based on a distance measurement between the object of the digital point scan and a transformed digital object model, the transformed digital object model generated by application of the model transformation to the digital object model; if the alignment metric exceeds a selected threshold value, performing a fine registration between the transformed digital object model and the object of the digital point scan; and if the alignment metric does not exceed the selected threshold value, performing a random rotation of the digital object model, a translation of the rotated digital object model towards a centroid of the object of the digital point scan, and an iteration of the method for scan point registration, using the translated digital object model.

Example 18 includes the subject matter of Example 17, wherein the alignment metric calculation further comprises the operation of summing the reciprocals of the Euclidean distance between each location data point of the transformed digital object model and a corresponding location data point of the object of the digital point scan.

Example 19 includes the subject matter of Examples 17 or 18, wherein the coarse registration is based on a rigid Coherent Point Drift (CPD) operation.

Example 20 includes the subject matter of any of Examples 17-19, wherein the fine registration is based on a non-rigid CPD operation.

Example 21 includes the subject matter of any of Examples 17-20, wherein the digital object model is a 3-dimensional (3-D) model and the object of the digital point scan is a 3-D depth scan.

Example 22 includes the subject matter of any of Examples 17-21, wherein the 3-D depth scan is provided by a depth camera.

Example 23 includes the subject matter of any of Examples 17-22, wherein the digital object model is a 2-dimensional (2-D) model and the object of the digital point scan is a 2-D image scan.

Example 24 includes the subject matter of any of Examples 17-23, further comprising the operation of performing a re-meshing operation on the digital object model, the re-meshing including down sampling and interpolation of location data points of the digital object model, based on sampling intervals of location data points of the object of the digital point scan.

Example 25 is a system for scan point registration. The system comprises: means for generating a model transformation based on a coarse registration between an object captured in a digital point scan and a digital object model; means for calculating an alignment metric based on a distance measurement between the object of the digital point scan and a transformed digital object model, the transformed digital object model generated by application of the model transformation to the digital object model; means for performing, if the alignment metric exceeds a selected threshold value, a fine registration between the transformed digital object model and the object of the digital point scan; and means for performing, if the alignment metric does not exceed the selected threshold value, a random rotation of the digital object model, a translation of the rotated digital object model towards a centroid of the object of the digital point scan, and an iteration of the scan point registration, using the translated digital object model.

Example 26 includes the subject matter of Example 25, wherein the alignment metric calculation further comprises means for summing the reciprocals of the Euclidean distance between each location data point of the transformed digital object model and a corresponding location data point of the object of the digital point scan.

Example 27 includes the subject matter of Examples 25 or 26, wherein the coarse registration is based on a rigid Coherent Point Drift (CPD) operation.

Example 28 includes the subject matter of any of Examples 25-27, wherein the fine registration is based on a non-rigid CPD operation.

Example 29 includes the subject matter of any of Examples 25-28, wherein the digital object model is a 3-dimensional (3-D) model and the object of the digital point scan is a 3-D depth scan.

Example 30 includes the subject matter of any of Examples 25-29, wherein the 3-D depth scan is provided by a depth camera.

Example 31 includes the subject matter of any of Examples 25-30, wherein the digital object model is a 2-dimensional (2-D) model and the object of the digital point scan is a 2-D image scan.

Example 32 includes the subject matter of any of Examples 25-31, further comprising means for performing a re-meshing operation on the digital object model, the re-meshing including down sampling and interpolation of location data points of the digital object model, based on sampling intervals of location data points of the object of the digital point scan.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A method for scan point registration, the method comprising:
    generating, by a processor-based system, a model transformation based on a coarse registration between an object captured in a digital point scan and a digital object model;
    calculating, by the processor-based system, an alignment metric based on a distance measurement between the object of the digital point scan and a transformed digital object model, the transformed digital object model generated by application of the model transformation to the digital object model;
    in response to the alignment metric exceeding a selected threshold value, performing, by the processor-based system, a fine registration between the transformed digital object model and the object of the digital point scan; and
    in response to the alignment metric not exceeding the selected threshold value, performing, by the processor-based system:
        a random rotation of the digital object model,
        a translation of the rotated digital object model towards a centroid of the object of the digital point scan, and
        an iteration of the method for scan point registration, using the translated digital object model.

2. The method of claim 1, wherein the alignment metric calculation further comprises summing the reciprocals of the Euclidean distance between each location data point of the transformed digital object model and a corresponding location data point of the object of the digital point scan.

3. The method of claim 1, wherein the coarse registration is based on a rigid Coherent Point Drift (CPD) operation.

4. The method of claim 1, wherein the fine registration is based on a non-rigid CPD operation.

5. The method of claim 1, wherein the digital object model is a 3-dimensional (3-D) model and the object of the digital point scan is a 3-D depth scan.

6. The method of claim 5, wherein the 3-D depth scan is provided by a depth camera.

7. The method of claim 1, wherein the digital object model is a 2-dimensional (2-D) model and the object of the digital point scan is a 2-D image scan.

8. The method of claim 1, further comprising performing a re-meshing operation on the digital object model, the re-meshing including down sampling and interpolation of location data points of the digital object model, based on sampling intervals of location data points of the object of the digital point scan.

9. A system for scan point registration, the system comprising:
    a coarse registration circuit configured to generate a model transformation based on a coarse registration between an object captured in a digital point scan and a digital object model;
    an alignment metric circuit configured to calculate an alignment metric based on a distance measurement between the object of the digital point scan and a transformed digital object model, the transformed digital object model generated by application of the model transformation to the digital object model;
    a fine registration circuit configured to perform a fine registration between the transformed digital object model and the object of the digital point scan, in response to the alignment metric exceeding a selected threshold value;
    a random rotation circuit configured to apply a random rotation to the digital object model to generate a rotated digital object model, in response to the alignment metric not exceeding the selected threshold value; and
    a translation circuit configured to translate the rotated digital object model towards a centroid of the object of the digital point scan, the translated digital object model for use by the coarse registration circuit in a scan point registration iteration.

10. The system of claim 9, wherein the alignment metric circuit is further configured to sum the reciprocals of the Euclidean distance between each location data point of the transformed digital object model and a corresponding location data point of the object of the digital point scan.

11. The system of claim 9, wherein the coarse registration is based on a rigid Coherent Point Drift (CPD) operation.

12. The system of claim 9, wherein the fine registration is based on a non-rigid CPD operation.

13. The system of claim 9, wherein the digital object model is a 3-dimensional (3-D) model and the object of the digital point scan is a 3-D depth scan.

14. The system of claim 13, further comprising a depth camera to provide the 3-D depth scan.

15. The system of claim 9, wherein the digital object model is a 2-dimensional (2-D) model and the object of the digital point scan is a 2-D image scan.

16. The system of claim 9, further comprising a re-meshing circuit configured to down sample and interpolate location data points of the digital object model, based on sampling intervals of location data points of the object of the digital point scan.

17. At least one non-transitory computer readable storage medium having instructions encoded thereon that, when executed by one or more processors, result in the following operations for scan point registration, the operations comprising:

generating a model transformation based on a coarse registration between an object captured in a digital point scan and a digital object model;

calculating an alignment metric based on a distance measurement between the object of the digital point scan and a transformed digital object model, the transformed digital object model generated by application of the model transformation to the digital object model;

in response to the alignment metric exceeding a selected threshold value, performing a fine registration between the transformed digital object model and the object of the digital point scan; and in response to the alignment metric not exceeding the selected threshold value, performing:

a random rotation of the digital object model, a translation of the rotated digital object model towards a centroid of the object of the digital point scan, and an iteration of the method for scan point registration, using the translated digital object model.

18. The computer readable storage medium of claim 17, wherein the alignment metric calculation further comprises the operation of summing the reciprocals of the Euclidean distance between each location data point of the transformed digital object model and a corresponding location data point of the object of the digital point scan.

19. The computer readable storage medium of claim 17, wherein the coarse registration is based on a rigid Coherent Point Drift (CPD) operation.

20. The computer readable storage medium of claim 17, wherein the fine registration is based on a non-rigid CPD operation.

21. The computer readable storage medium of claim 17, wherein the digital object model is a 3-dimensional (3-D) model and the object of the digital point scan is a 3-D depth scan.

22. The computer readable storage medium of claim 21, wherein the 3-D depth scan is provided by a depth camera.

23. The computer readable storage medium of claim 17, wherein the digital object model is a 2-dimensional (2-D) model and the object of the digital point scan is a 2-D image scan.

24. The computer readable storage medium of claim 17, further comprising the operation of performing a re-meshing operation on the digital object model, the re-meshing including down sampling and interpolation of location data points of the digital object model, based on sampling intervals of location data points of the object of the digital point scan.

* * * * *